United States Patent
Lim

(10) Patent No.: US 12,348,892 B2
(45) Date of Patent: Jul. 1, 2025

(54) DISPLAY DEVICE AND SYSTEM

(71) Applicant: LG ELECTRONICS INC., Seoul (KR)

(72) Inventor: Kyoungryul Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 221 days.

(21) Appl. No.: 18/107,472

(22) Filed: Feb. 8, 2023

(65) Prior Publication Data

US 2024/0040076 A1 Feb. 1, 2024

(30) Foreign Application Priority Data

Jul. 29, 2022 (KR) .......................... 10-2022-0094602

(51) Int. Cl.
| | | |
|---|---|---|
| H04N 5/33 | (2023.01) | |
| G06F 1/3234 | (2019.01) | |
| H04N 5/63 | (2006.01) | |
| H04N 21/443 | (2011.01) | |

(52) U.S. Cl.
CPC ............. *H04N 5/33* (2013.01); *G06F 1/3243* (2013.01); *H04N 5/63* (2013.01); *H04N 21/4436* (2013.01)

(58) Field of Classification Search
CPC ...... G06F 1/3209; G06F 1/3228; G06F 1/324; G06F 1/3243; G06F 1/3296; G06F 9/4418; H04N 21/426; H04N 21/4436; H04N 5/33; H04N 5/63
USPC ........................................................ 348/164
See application file for complete search history.

(56) References Cited

U.S. PATENT DOCUMENTS

| | | | |
|---|---|---|---|
| 8,254,203 B2 | 8/2012 | Park | |
| 9,846,471 B1* | 12/2017 | Arora | .................... G06F 1/3209 |
| 2015/0294077 A1 | 10/2015 | Jani et al. | |
| 2018/0216389 A1* | 8/2018 | Tsui | ........................ E05F 15/40 |
| 2021/0120205 A1 | 4/2021 | Wang | |
| 2022/0083124 A1* | 3/2022 | Tung | ..................... G06F 1/3206 |

FOREIGN PATENT DOCUMENTS

| | | | |
|---|---|---|---|
| EP | 2728894 | 5/2014 | |
| EP | 2728894 A1 * | 5/2014 | .............. G05F 1/66 |
| KR | 1020060071041 | 6/2006 | |
| KR | 1020060129613 | 12/2006 | |
| KR | 1020100129078 | 12/2010 | |
| KR | 1020140066375 | 6/2014 | |

OTHER PUBLICATIONS

European Patent Office Application Serial No. 22210512.4, Search Report dated Aug. 25, 2023, 4 pages.
Korean Intellectual Property Office Application No. 10-2022-0094602, Office Action dated Aug. 26, 2024, 4 pages.

* cited by examiner

*Primary Examiner* — Kathleen M Walsh
(74) *Attorney, Agent, or Firm* — LEE, HONG, DEGERMAN, KANG & WAIMEY

(57) ABSTRACT

A display device may include a micro control unit configured to receive an IR signal and to operate in a low power mode or an active power mode, and may determine whether a wakeup signal is detected from the IR signal while the micro control unit operates in the low power mode and switch a power mode of the micro control unit from the low power mode to the active power mode when the wakeup signal is detected.

18 Claims, 13 Drawing Sheets

1110

1120

1130

DISPLAY DEVICE AND SYSTEM

CROSS-REFERENCE TO RELATED APPLICATION

Pursuant to 35 U.S.C. § 119(a), this application claims the benefit of earlier filing date and right of priority to Korean Patent Application No. 10-2022-0094602, filed on Jul. 29, 2022, the contents of which are all hereby incorporated by reference herein in its entirety.

BACKGROUND OF THE INVENTION

The present disclosure relates to a display device capable of detecting an IR signal.

DISCUSSION OF THE RELATED ART

Digital TV services using wired or wireless communication networks are becoming common. Digital TV services may provide various services which cannot be provided by the existing analog broadcast service.

For example, Internet protocol television (IPTV) and smart TV services which are types of digital TV services provide interactivity to allow user to actively select a type of a program to be watched, a viewing time, etc. The IPTV and smart TV services may provide various additional services, such as Internet search, home shopping and online games, based on such interactivity.

The TV may operate in an active mode that an IR signal is periodically recognized for a minimum time period in order to use a minimum amount of power, and may operate in a low power mode in which operation is performed in a standby mode for the remaining time period.

However, in the related art, since the TV operates in the active mode for the minimum time period in a low power mode, the IR signal from a remote control device such as a remote controller may be missed.

That is, although the duration of the active mode is reduced to reduce power consumption generated during operation in the active mode, the IR signal may be recognized only for the reduced time, so that it is difficult to receive the IR signal from the remote control device.

In addition, when an external noise signal has an IR component, there is a problem in that the display device malfunctions due to an external noise signal.

To overcome this, a technology in which the remote control device transmits an IR signal twice has emerged. However, when a first IR signal is recognized, the low power mode of the TV is released, and there is a risk of malfunction due to other external IR signals.

SUMMARY OF THE INVENTION

An object of the present disclosure is to minimize power consumption by preventing a malfunction of a display device that may be generated due to an external noise signal including an IR component.

An object of the present disclosure is to clarify a power mode condition of a MCU according to reception of an IR signal.

A display device according to an embodiment of the present disclosure may include a micro control unit configured to receive an IR signal and to operate in a low power mode or an active power mode, and may determine whether a wakeup signal is detected from the IR signal while the micro control unit operates in the low power mode and switch a power mode of the micro control unit from the low power mode to the active power mode when the wakeup signal is detected.

According to a display device according to an embodiment of the present disclosure may maintain the active mode of the micro control unit when the wakeup signal is detected from the IR signal and switch the power mode of the micro control unit to the active power mode when the IR reception standby signal is detected.

According to an embodiment of the present disclosure, by clearly distinguishing between an external noise signal and an IR signal received from a remote control device, a malfunction of a display device can be prevented, switching into an active power mode according to malfunction can be prevented and power consumption can be greatly reduced.

According to an embodiment of the present disclosure, it is possible to clearly distinguish between the external noise signal and the IR signal received from the remote control device, thereby reducing the loss of power consumed for waiting for IR signal reception standby.

DETAILED DESCRIPTION OF THE PREFERRED EMBODIMENTS

Hereinafter, embodiments of the present disclosure will be described in detail with reference to the drawings. The suffixes "module" and "unit or portion" for components used in the following description are merely provided only for facilitation of preparing this specification, and thus they are not granted a specific meaning or function.

The display device according to an embodiment of the present disclosure is, for example, an intelligent display device in which a computer support function is added to a broadcast reception function, and is faithful to a broadcast reception function and has an Internet function added thereto, such as a handwritten input device, a touch screen Alternatively, a more user-friendly interface such as a spatial remote control may be provided. In addition, it is connected to the Internet and a computer with the support of a wired or wireless Internet function, so that functions such as e-mail, web browsing, banking, or games can also be performed. A standardized general-purpose OS may be used for these various functions.

Accordingly, in the display device described in the present disclosure, various user-friendly functions can be performed because various applications can be freely added or deleted, for example, on a general-purpose OS kernel. More specifically, the display device may be, for example, a network TV, HBBTV, smart TV, LED TV, OLED TV, and the like, and may be applied to a smart phone in some cases.

Figure 1:
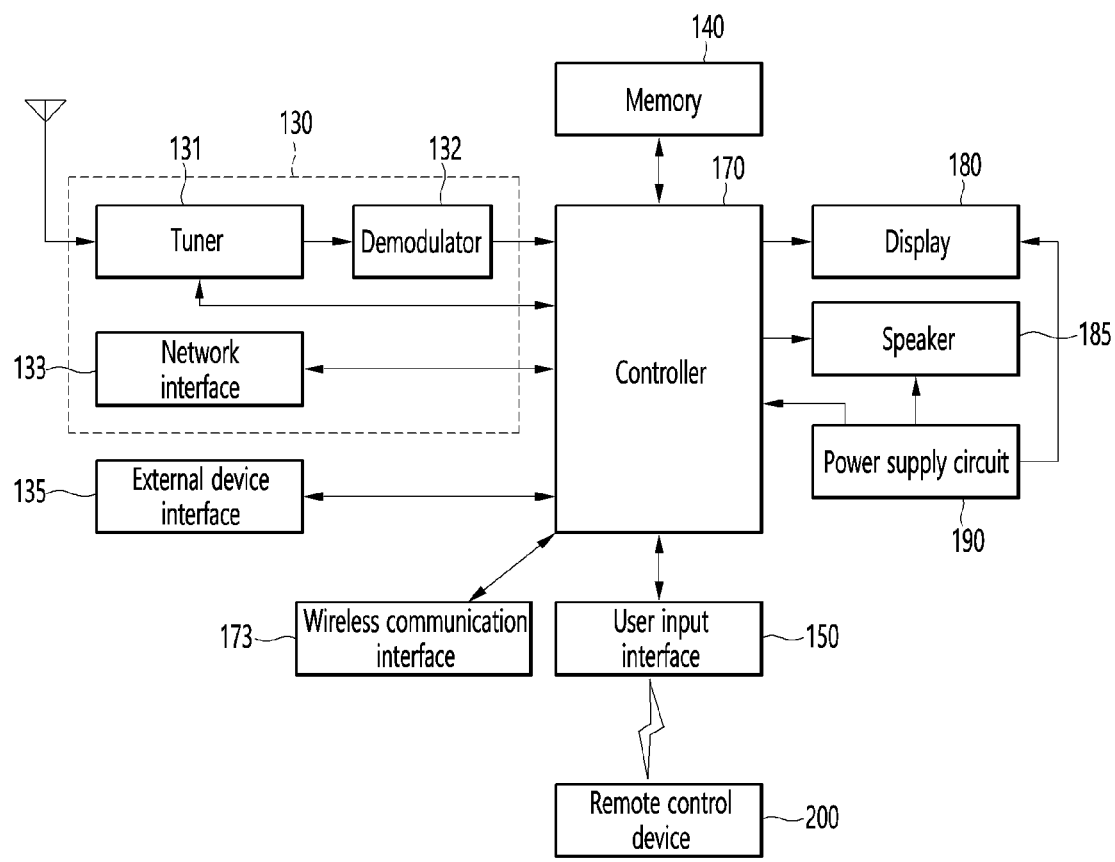
FIG. 1 is a block diagram illustrating a configuration of a display device according to an embodiment of the present disclosure.

FIG. 1 is a block diagram showing a configuration of a display device according to an embodiment of the present disclosure.

Referring to FIG. 1, a display device 100 may include a broadcast receiver 130, an external device interface 135, a memory 140, a user input interface 150, a controller 170, a wireless communication interface 173, a display 180, a speaker 185, and a power supply circuit 190.

The broadcast receiving unit 130 may include a tuner 131, a demodulator 132, and a network interface 133.

The tuner 131 may select a specific broadcast channel according to a channel selection command. The tuner 131 may receive a broadcast signal for the selected specific broadcast channel.

The demodulator 132 may separate the received broadcast signal into a image signal, an audio signal, and a data signal related to a broadcast program, and restore the separated image signal, audio signal, and data signal to a format capable of being output.

The external device interface 135 may receive an application or a list of applications in an external device adjacent thereto, and transmit the same to the controller 170 or the memory 140.

The external device interface 135 may provide a connection path between the display device 100 and an external device. The external device interface 135 may receive one or more of images and audio output from an external device connected to the display device 100 in a wired or wireless manner, and transmit the same to the controller 170. The external device interface 135 may include a plurality of external input terminals. The plurality of external input terminals may include an RGB terminal, one or more High Definition Multimedia Interface (HDMI) terminals, and a component terminal.

The image signal of the external device input through the external device interface unit 135 may be output through the display 180. The audio signal of the external device input through the external device interface 135 may be output through the speaker 185.

The external device connectable to the external device interface 135 may be any one of a set-top box, a Blu-ray player, a DVD player, a game machine, a sound bar, a smartphone, a PC, a USB memory, and a home theater, but this is only an example.

The network interface 133 may provide an interface for connecting the display device 100 to a wired/wireless network including an Internet network. The network interface 133 may transmit or receive data to or from other users or other electronic devices through a connected network or another network linked to the connected network.

In addition, a part of content data stored in the display device 100 may be transmitted to a selected user among a selected user or a selected electronic device among other users or other electronic devices registered in advance in the display device 100.

The network interface 133 may access a predetermined web page through the connected network or the other network linked to the connected network. That is, it is possible to access a predetermined web page through a network, and transmit or receive data to or from a corresponding server.

In addition, the network interface 133 may receive content or data provided by a content provider or a network operator. That is, the network interface 133 may receive content such as movies, advertisements, games, VOD, and broadcast signals and information related thereto provided from a content provider or a network provider through a network.

In addition, the network interface 133 may receive update information and update files of firmware provided by the network operator, and may transmit data to an Internet or content provider or a network operator.

The network interface 133 may select and receive a desired application from among applications that are open to the public through a network.

The memory 140 may store programs for signal processing and control of the controller 170, and may store images, audio, or data signals, which have been subjected to signal-processed.

In addition, the memory 140 may perform a function for temporarily storing images, audio, or data signals input from an external device interface 135 or the network interface 133, and store information on a predetermined image through a channel storage function.

The memory 140 may store an application or a list of applications input from the external device interface 135 or the network interface 133.

The display device 100 may play back a content file (a moving image file, a still image file, a music file, a document file, an application file, or the like) stored in the memory 140 and provide the same to the user.

The user input interface 150 may transmit a signal input by the user to the controller 170 or a signal from the controller 170 to the user. For example, the user input interface 150 may receive and process a control signal such as power on/off, channel selection, screen settings, and the like from the remote control device 200 in accordance with various communication methods, such as a Bluetooth communication method, a WB (Ultra Wideband) communication method, a ZigBee communication method, an RF (Radio Frequency) communication method, or an infrared (IR)

communication method or may perform processing to transmit the control signal from the controller 170 to the remote control device 200.

In addition, the user input interface 150 may transmit a control signal input from a local key (not shown) such as a power key, a channel key, a volume key, and a setting value to the controller 170.

The image signal image-processed by the controller 170 may be input to the display 180 and displayed as an image corresponding to a corresponding image signal. Also, the image signal image-processed by the controller 170 may be input to an external output device through the external device interface 135.

The audio signal processed by the controller 170 may be output to the speaker 185. Also, the audio signal processed by the controller 170 may be input to the external output device through the external device interface 135.

In addition, the controller 170 may control the overall operation of the display device 100.

In addition, the controller 170 may control the display device 100 by a user command input through the user input interface 150 or an internal program and connect to a network to download an application a list of applications or applications desired by the user to the display device 100.

The controller 170 may allow the channel information or the like selected by the user to be output through the display 180 or the speaker 185 along with the processed image or audio signal.

In addition, the controller 170 may output an image signal or an audio signal through the display 180 or the speaker 185, according to a command for playing back an image of an external device through the user input interface 150, the image signal or the audio signal being input from an external device, for example, a camera or a camcorder, through the external device interface 135.

Meanwhile, the controller 170 may allow the display 180 to display an image, for example, allow a broadcast image which is input through the tuner 131 or an external input image which is input through the external device interface 135, an image which is input through the network interface unit or an image which is stored in the memory 140 to be displayed on the display 180. In this case, an image being displayed on the display 180 may be a still image or a moving image, and may be a 2D image or a 3D image.

In addition, the controller 170 may allow content stored in the display device 100, received broadcast content, or external input content input from the outside to be played back, and the content may have various forms such as a broadcast image, an external input image, an audio file, still images, accessed web screens, and document files.

The wireless communication interface 173 may communicate with an external device through wired or wireless communication. The wireless communication interface 173 may perform short range communication with an external device. To this end, the wireless communication interface 173 may support short range communication using at least one of Bluetooth™, Radio Frequency Identification (RFID), Infrared Data Association (IrDA), Ultra Wideband (UWB), ZigBee, Near Field Communication (NFC), Wi-Fi (Wireless-Fidelity), Wi-Fi (Wireless-Fidelity), Wi-Fi Direct, and Wireless USB (Wireless Universal Serial Bus) technologies. The wireless communication interface 173 may support wireless communication between the display device 100 and a wireless communication system, between the display device 100 and another display device 100, or between the display device 100 and a network in which the display device 100 (or an external server) is located through wireless area networks. The wireless area networks may be wireless personal area networks.

Here, the another display device 100 may be a wearable device (e.g., a smartwatch, smart glasses or a head mounted display (HMD), a mobile terminal such as a smart phone, which is able to exchange data (or interwork) with the display device 100 according to the present disclosure. The wireless communication interface 173 may detect (or recognize) a wearable device capable of communication around the display device 100.

Furthermore, when the detected wearable device is an authenticated device to communicate with the display device 100 according to the present disclosure, the controller 170 may transmit at least a portion of data processed by the display device 100 to the wearable device through the wireless communication interface 173. Therefore, a user of the wearable device may use data processed by the display device 100 through the wearable device.

The display 180 may convert image signals, data signals, and OSD signals processed by the controller 170, or image signals or data signals received from the external device interface 135 into R, G, and B signals, and generate drive signals.

Meanwhile, since the display device 100 shown in FIG. 1 is only an embodiment of the present disclosure, some of the illustrated components may be integrated, added, or omitted depending on the specification of the display device 100 that is actually implemented.

That is, two or more components may be combined into one component, or one component may be divided into two or more components as necessary. In addition, a function performed in each block is for describing an embodiment of the present disclosure, and its specific operation or device does not limit the scope of the present disclosure.

According to another embodiment of the present disclosure, unlike the display device 100 shown in FIG. 1, the display device 100 may receive an image through the network interface 133 or the external device interface 135 without a tuner 131 and a demodulator 132 and play back the same.

For example, the display device 100 may be divided into an image processing device, such as a set-top box, for receiving broadcast signals or content according to various network services, and a content playback device that plays back content input from the image processing device.

In this case, an operation method of the display device according to an embodiment of the present disclosure will be described below may be implemented by not only the display device 100 as described with reference to FIG. 1 and but also one of an image processing device such as the separated set-top box and a content playback device including the display 180 the audio output unit 185.

Next, a remote control device according to an embodiment of the present disclosure will be described with reference to FIGS. 2 to 3.

Figure 2:
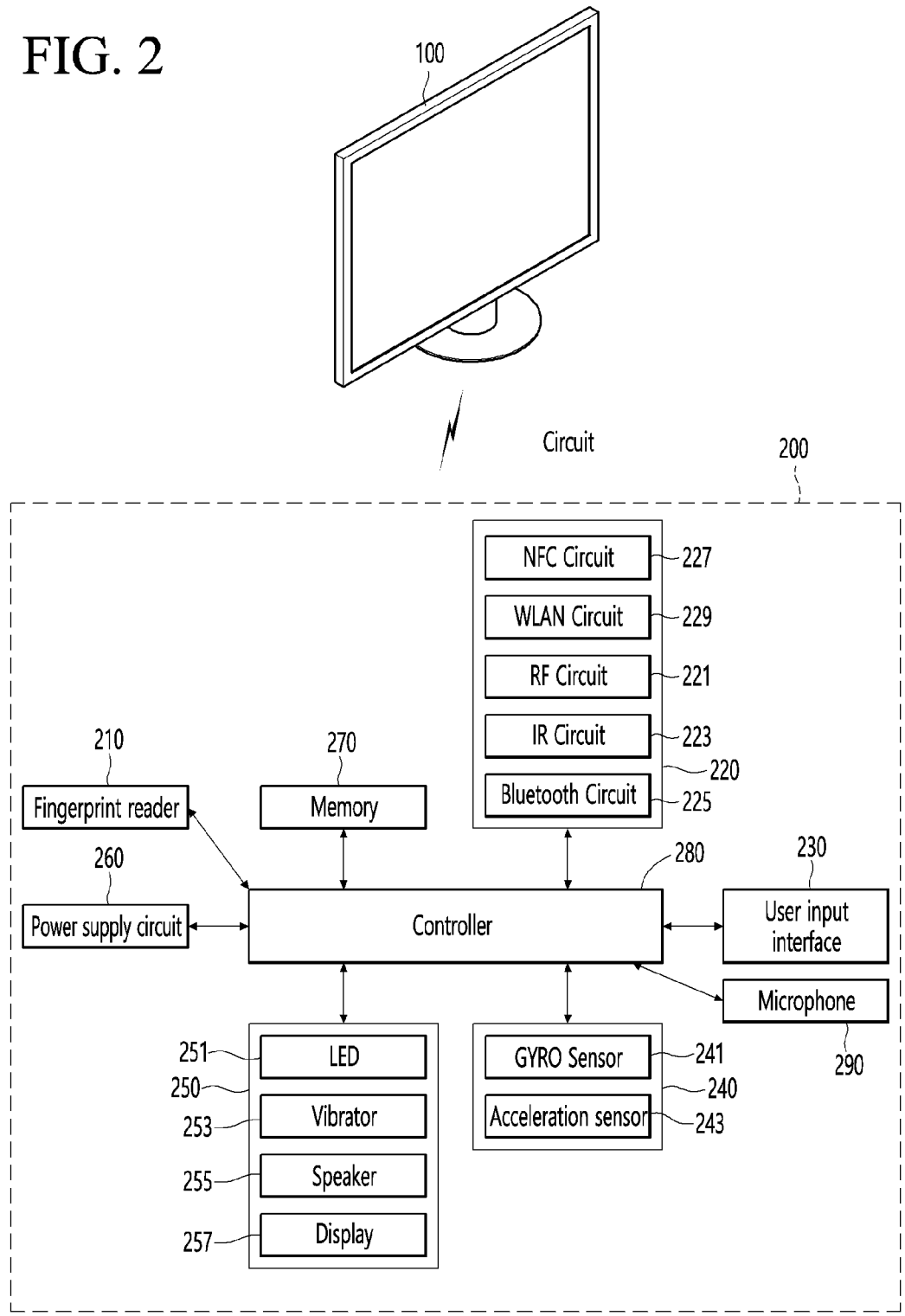
FIG. 2 is a block diagram of a remote control device according to an embodiment of the present disclosure.
Figure 3:
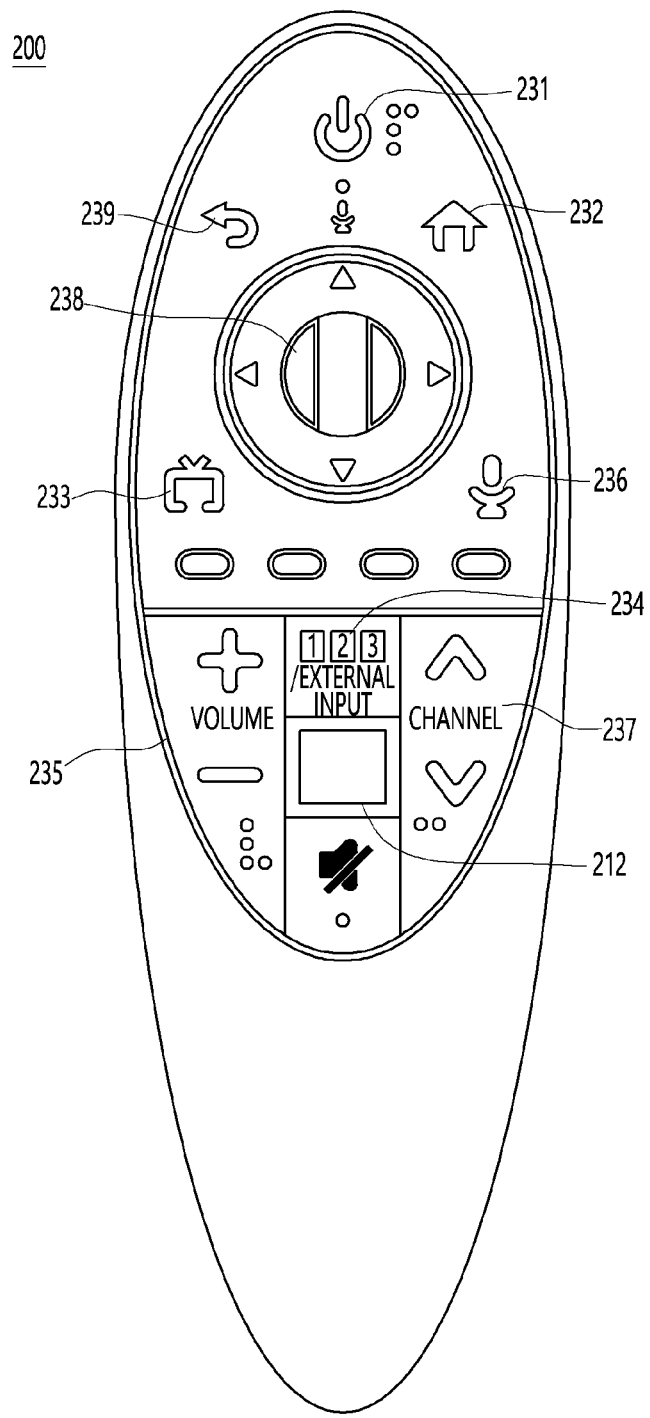
FIG. 3 shows an example of an actual configuration of a remote control device according to an embodiment of the present disclosure.

FIG. 2 is a block diagram of a remote control device according to an embodiment of the present disclosure, and FIG. 3 shows an actual configuration example of a remote control device 200 according to an embodiment of the present disclosure.

First, referring to FIG. 2, the remote control device 200 may include a fingerprint reader 210, a wireless communication circuit 220, a user input interface 230, a sensor 240, an output interface 250, a power supply circuit 260, a memory 270, a controller 280, and a microphone 290.

Referring to FIG. 2, the wireless communication circuit 220 may transmit and receive signals to and from any one of display devices according to embodiments of the present disclosure described above.

The remote control device 200 may include an RF circuit 221 capable of transmitting and receiving signals to and from the display device 100 according to the RF communication standard, and an IR circuit 223 capable of transmitting and receiving signals to and from the display device 100 according to the IR communication standard. In addition, the remote control device 200 may include a Bluetooth circuit 225 capable of transmitting and receiving signals to and from the display device 100 according to the Bluetooth communication standard. In addition, the remote control device 200 may include an NFC circuit 227 capable of transmitting and receiving signals to and from the display device 100 according to the NFC (near field communication) communication standard, and a WLAN circuit 229 capable of transmitting and receiving signals to and from the display device 100 according to the wireless LAN (WLAN) communication standard.

In addition, the remote control device 200 may transmit a signal containing information on the movement of the remote control device 200 to the display device 100 through the wireless communication circuit 220.

In addition, the remote control device 200 may receive a signal transmitted by the display device 100 through the RF circuit 221, and transmit a command regarding power on/off, channel change, volume adjustment, or the like to the display device 100 through the IR circuit 223 as necessary.

The user input interface 230 may include a keypad, a button, a touch pad, a touch screen, or the like. The user may input a command related to the display device 100 to the remote control device 200 by operating the user input interface 230. When the user input interface 230 includes a hard key button, the user may input a command related to the display device 100 to the remote control device 200 through a push operation of the hard key button. Details will be described with reference to FIG. 3.

Referring to FIG. 3, the remote control device 200 may include a plurality of buttons. The plurality of buttons may include a fingerprint recognition button 212, a power button 231, a home button 232, a live button 233, an external input button 234, a volume control button 235, a voice recognition button 236, a channel change button 237, an OK button 238, and a back-play button 239.

The fingerprint recognition button 212 may be a button for recognizing a user's fingerprint. In one embodiment, the fingerprint recognition button 212 may enable a push operation, and thus may receive a push operation and a fingerprint recognition operation.

The power button 231 may be a button for turning on/off the power of the display device 100.

The home button 232 may be a button for moving to the home screen of the display device 100.

The live button 233 may be a button for displaying a real-time broadcast program.

The external input button 234 may be a button for receiving an external input connected to the display device 100.

The volume control button 235 may be a button for adjusting the level of the volume output by the display device 100.

The voice recognition button 236 may be a button for receiving a user's voice and recognizing the received voice.

The channel change button 237 may be a button for receiving a broadcast signal of a specific broadcast channel.

The OK button 238 may be a button for selecting a specific function, and the back-play button 239 may be a button for returning to a previous screen.

A description will be given referring again to FIG. 2.

When the user input interface 230 includes a touch screen, the user may input a command related to the display device 100 to the remote control device 200 by touching a soft key of the touch screen. In addition, the user input interface 230 may include various types of input means that may be operated by a user, such as a scroll key or a jog key, and the present embodiment does not limit the scope of the present disclosure.

The sensor 240 may include a gyro sensor 241 or an acceleration sensor 243, and the gyro sensor 241 may sense information regarding the movement of the remote control device 200.

For example, the gyro sensor 241 may sense information about the operation of the remote control device 200 based on the x, y, and z axes, and the acceleration sensor 243 may sense information about the moving speed of the remote control device 200. Meanwhile, the remote control device 200 may further include a distance measuring sensor to sense the distance between the display device 100 and the display 180.

The output interface 250 may output an image or audio signal corresponding to the operation of the user input interface 230 or a signal transmitted from the display device 100.

The user may recognize whether the user input interface 230 is operated or whether the display device 100 is controlled through the output interface 250.

For example, the output interface 450 may include an LED 251 that emits light, a vibrator 253 that generates vibration, a speaker 255 that outputs sound, or a display 257 that outputs an image when the user input interface 230 is operated or a signal is transmitted and received to and from the display device 100 through the wireless communication unit 225.

In addition, the power supply circuit 260 may supply power to the remote control device 200, and stop power supply when the remote control device 200 has not moved for a predetermined time to reduce power consumption.

The power supply circuit 260 may restart power supply when a predetermined key provided in the remote control device 200 is operated.

The memory 270 may store various types of programs and application data required for control or operation of the remote control device 200.

When the remote control device 200 transmits and receives signals wirelessly through the display device 100 and the RF circuit 221, the remote control device 200 and the display device 100 transmit and receive signals through a predetermined frequency band. The controller 280 of the remote control device 200 may store and refer to information on a frequency band capable of wirelessly transmitting and receiving signals to and from the display device 100 paired with the remote control device 200 in the memory 270.

The controller 280 may control all matters related to the control of the remote control device 200. The controller 280 may transmit a signal corresponding to a predetermined key operation of the user input interface 230 or a signal corresponding to the movement of the remote control device 200 sensed by the sensor 240 through the wireless communication unit 225.

Also, the microphone 290 of the remote control device 200 may obtain a speech.

A plurality of microphones 290 may be provided.

Next, a description will be given referring to FIG. 4.

Figure 4:
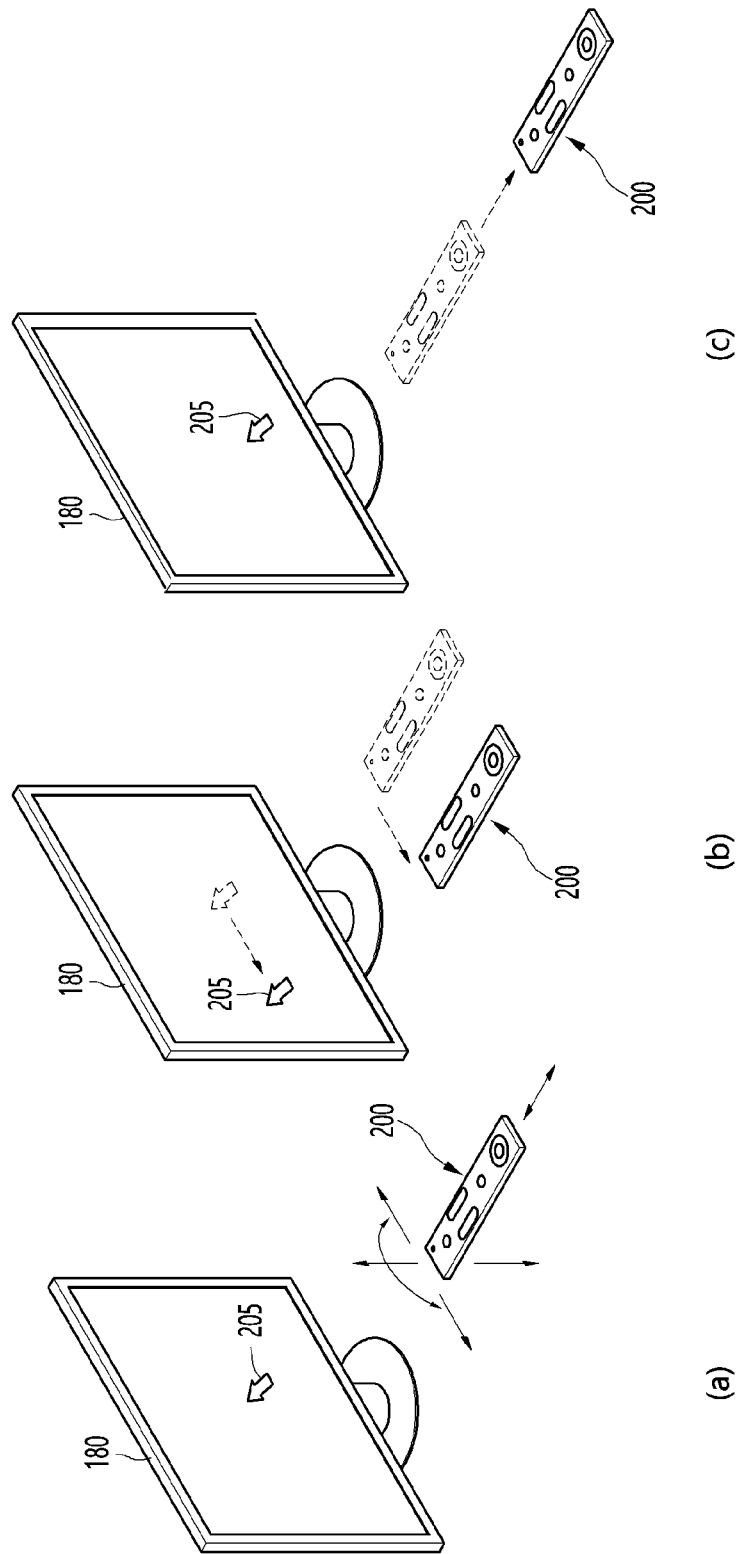
FIG. 4 shows an example of using a remote control device according to an embodiment of the present disclosure.

FIG. 4 shows an example of using a remote control device according to an embodiment of the present disclosure.

In FIG. 4, (a) illustrates that a pointer 205 corresponding to the remote control device 200 is displayed on the display 180.

The user may move or rotate the remote control device 200 up, down, left and right. The pointer 205 displayed on the display 180 of the display device 100 may correspond to the movement of the remote control device 200. As shown in the drawings, the pointer 205 is moved and displayed according to movement of the remote control device 200 in a 3D space, so the remote control device 200 may be called a space remote control device.

In (b) of FIG. 4, it is illustrated that that when the user moves the remote control device 200 to the left, the pointer 205 displayed on the display 180 of the display device 100 moves to the left correspondingly.

Information on the movement of the remote control device 200 detected through a sensor of the remote control device 200 is transmitted to the display device 100. The display device 100 may calculate the coordinates of the pointer 205 based on information on the movement of the remote control device 200. The display device 100 may display the pointer 205 to correspond to the calculated coordinates.

In (c) of FIG. 4, it is illustrated that a user moves the remote control device 200 away from the display 180 while pressing a specific button in the remote control device 200. Accordingly, a selected area in the display 180 corresponding to the pointer 205 may be zoomed in and displayed enlarged.

Conversely, when the user moves the remote control device 200 to be close to the display 180, the selected area in the display 180 corresponding to the pointer 205 may be zoomed out and displayed reduced.

On the other hand, when the remote control device 200 moves away from the display 180, the selected area may be zoomed out, and when the remote control device 200 moves to be close to the display 180, the selected area may be zoomed in.

Also, in a state in which a specific button in the remote control device 200 is being pressed, recognition of up, down, left, or right movements may be excluded. That is, when the remote control device 200 moves away from or close to the display 180, the up, down, left, or right movements are not recognized, and only the forward and backward movements may be recognized. In a state in which a specific button in the remote control device 200 is not being pressed, only the pointer 205 moves according to the up, down, left, or right movements of the remote control device 200.

Meanwhile, the movement speed or the movement direction of the pointer 205 may correspond to the movement speed or the movement direction of the remote control device 200.

Meanwhile, in the present specification, a pointer refers to an object displayed on the display 180 in response to an operation of the remote control device 200. Accordingly, objects of various shapes other than the arrow shape shown in the drawings are possible as the pointer 205. For example, the object may be a concept including a dot, a cursor, a prompt, a thick outline, and the like. In addition, the pointer 205 may be displayed corresponding to any one point among points on a horizontal axis and a vertical axis on the display 180, and may also be displayed corresponding to a plurality of points such as a line and a surface.

Figure 5:
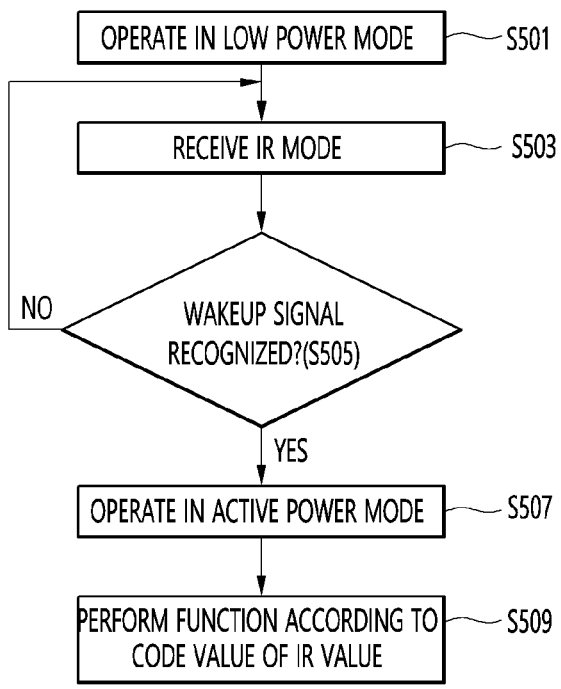
FIG. 5 is a flowchart illustrating a method of operating a display device according to an embodiment of the present disclosure.

FIG. 5 is a flowchart illustrating a method of operating a display device according to an embodiment of the present disclosure.

Hereinafter, the remote control device and the display device 100 may be configured as one system.

Referring to FIG. 5, the controller 170 of the display device 100 operates a power mode of a micro control unit (MCU) in a low power mode (S501).

In an embodiment, the micro control unit may include an IR reception interface capable of receiving an IR signal.

The micro control unit may be included in the user input interface 150, but is not limited thereto, and may be included in the controller 170.

In an embodiment, the power mode of the micro control unit may include a low power mode and an active power mode.

The low power mode may be a mode that a minimal amount of power is supplied to the micro control unit that receives the IR signal. The low power mode may be a mode in which an active mode indicating a period in which an IR signal may be recognized and a standby mode indicating a period in which an IR signal may not be recognized and it is in a standby state are periodically repeated.

The active power mode may be a mode in which an active mode in which an IR signal may be recognized is maintained.

Figure 6:
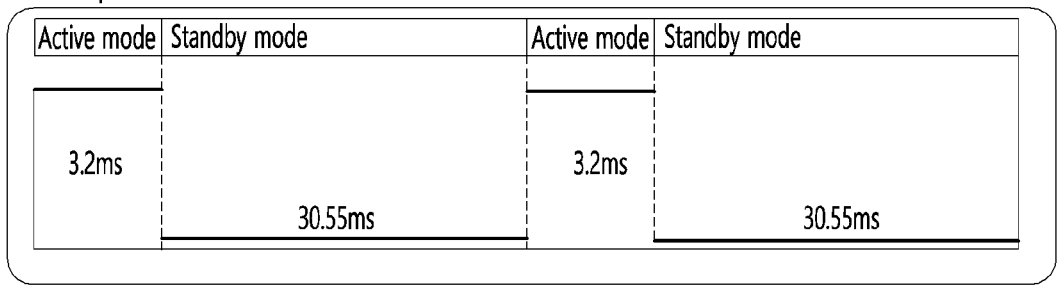
FIG. 6 is a view illustrating a low power mode according to an embodiment of the present disclosure.

FIG. 6 is a view illustrating a low power mode according to an embodiment of the present disclosure.

Referring to FIG. 6, the micro control unit may periodically repeat the active mode and the standby mode in the low power mode.

The active mode may be maintained for a period of 3.2 ms, and the standby mode following the active mode may be maintained for a period of 30.55 ms.

The active mode may be a mode in which an IR signal may be recognized, and the standby mode may be a standby mode in which an IR signal may not be recognized.

Power consumption of the micro control unit may be reduced as a time period during which the active mode is maintained is shorter.

FIG. 5 will be described again.

The micro control unit of the display device 100 receives an IR signal (S503).

The micro control unit may receive the IR signal from the remote control device 200 or the outside.

For this, the micro control unit may include an IR reception interface such as an IR sensor.

As another example, the IR reception interface may be configured separately from the micro control unit.

The controller 170 determines whether a wakeup signal is recognized from the received IR signal (S505).

The controller 170 may determine whether a wakeup signal is included in the IR signal.

In an embodiment, the wakeup signal may be a signal for operating the power mode of the micro control unit in the active power mode. The wakeup signal may also be a kind of IR signal.

The wakeup signal may be a signal (e.g., 00) including at least two consecutive 0 data. Data <1> and data <0> may be distinguished from each other by the length of the pulse.

A signal representing digital data 0 may be referred to as an off signal, and a signal representing digital data 1 may be referred to as an on signal.

The wakeup signal may have a time period capable of covering one active period (period in which the active mode is maintained during one cycle) and one standby period (period in which the standby mode is maintained during one cycle). For example, the wakeup signal may be a signal capable of covering a time period of approximately 33.7 ms.

This is because the wakeup signal is also a kind of IR signal and thus it must have a time period capable of covering one active period and one standby period so that it may be recognized through the active period.

For example, the wakeup signal may be a signal in which 30 <0>s are combined. The wakeup signal must contain at least two consecutive zeros.

When the wakeup signal is recognized from the received IR signal, the controller 170 operates the operation mode of the micro control unit in the active power mode (S507).

In the active power mode, the micro control unit may be maintained in the active mode. In the active power mode, the micro control unit may be maintained in the active mode to continuously receive the IR signal.

The controller 170 performs a function according to a code value included in the IR signal in the active power mode (S509).

The IR signal may include a wakeup signal and an operation command signal.

The operation command signal is a signal following the wakeup signal and may include a command code instructing a specific operation of the display device 100.

The controller 170 may perform a function corresponding to the command code included in the operation command signal included in the IR signal. The commend code may include a code value composed of a combination of digital data 0 and 1.

For example, the function of the display device 100 may be any one of power on, channel change, and menu selection, but this is only an example.

Figure 7A:
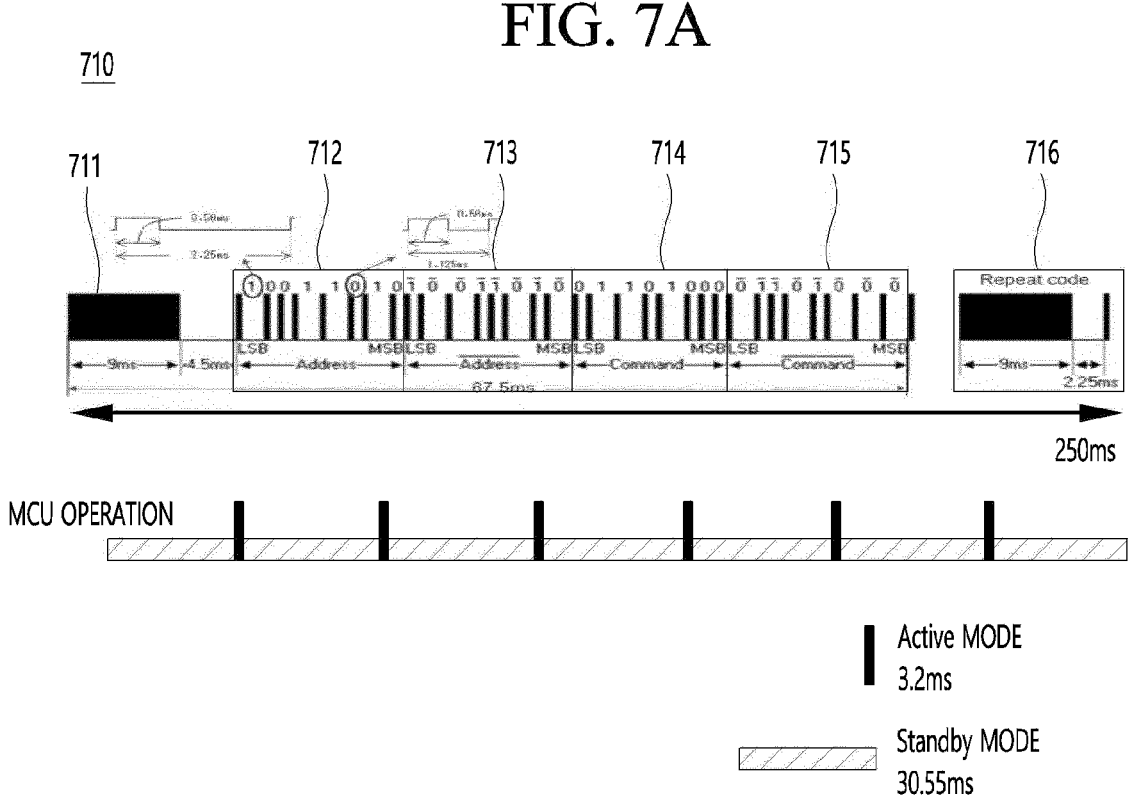
FIG. 7A is a diagram showing the configuration of an IR signal according to the related art.
Figure 7B:
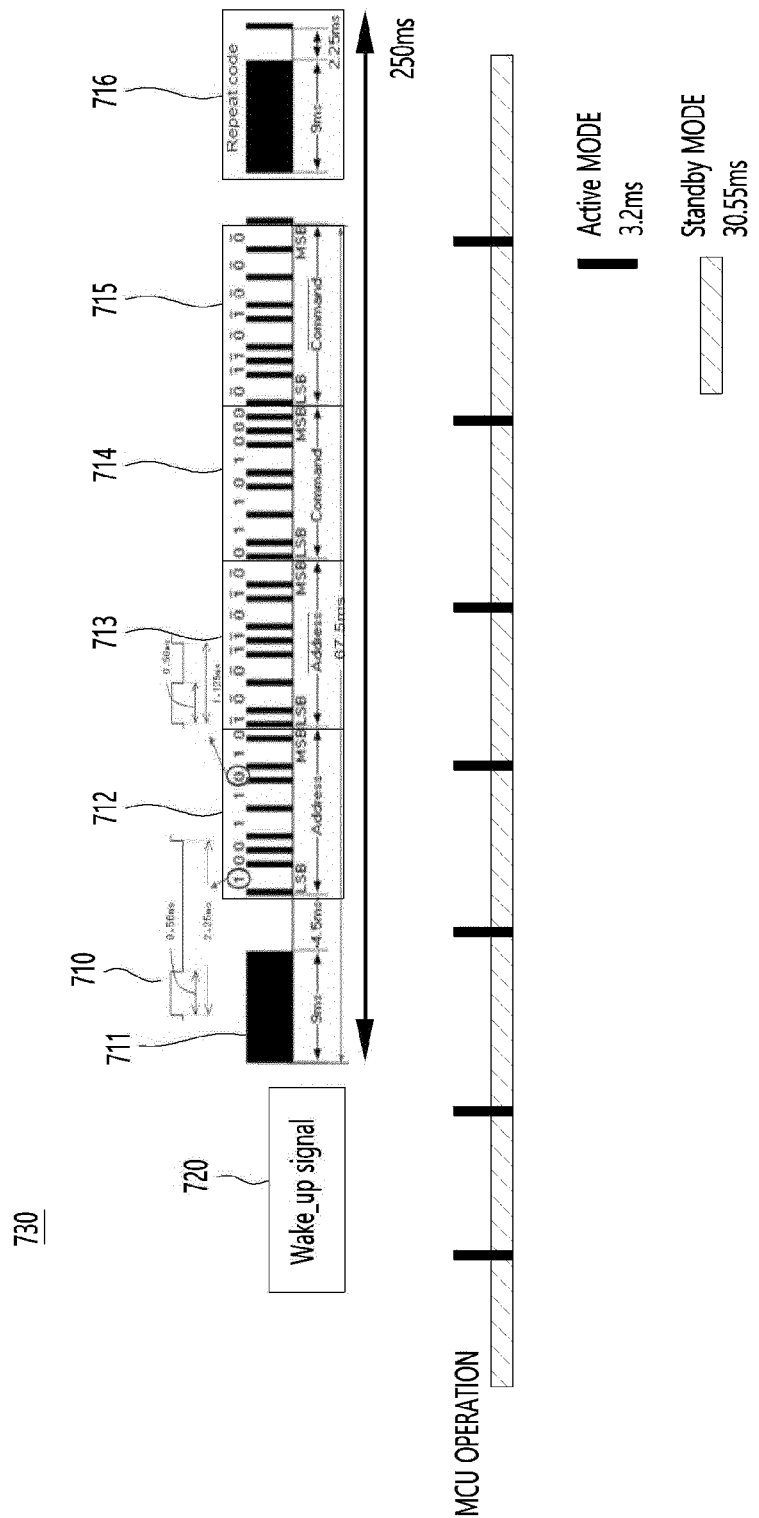
FIG. 7B is a diagram showing the configuration of an IR signal including a wakeup signal according to an embodiment of the present disclosure.

FIG. 7A is a diagram showing the configuration of an IR signal according to the related art, and FIG. 7B is a diagram showing the configuration of an IR signal including a wakeup signal according to an embodiment of the present disclosure.

Referring to FIG. 7A, a conventional IR output signal 710 may include a start key code 711, an address code 712, an inverted address code 713, a command code 714, an inverted command code 715 and a repeat code 716.

The start key code 711 is a code that maintains a high state for 9 ms, and may be a code indicating the start of the IR output signal 710.

After transmission of the start key code 711, the low state may be maintained for 4.5 ms.

The address code 712 and the inverted address code 713 may be codes containing address information for identifying the remote control device 200 that outputs the IR signal.

The command code 714 and the inverted command code 715 may be codes indicating a function of the display device 100 corresponding to the IR signal.

The address code 712 and the command code 714 are inverted and sent again, in order to improve a reception rate through error detection.

0 and 1 constituting the address code 712 and the command code 714 may be distinguished by the length of the pulse. If the pulse length is 1.125 ms, it is 0, and if it is 2.25 ms, it is 1.

The repeat code 716 may be a code indicating that a button provided in the remote control device 200 is kept pressed.

In the MCU, an active mode having a time period of 3.2 ms and a standby mode having a time period of 30.55 ms may be periodically alternately repeated in the low power mode.

The IR output signal 710 is a signal having a time period of 250 ms, and the MCU may recognize the start key code 711 of the IR output signal 710 only during the period of 3.2 ms. Thus, If the timings do not match, the MCU may miss the IR output signal 710 in the low power mode.

That is, when the time period of the start key code 711 of the IR output signal 710 and the time period during which the MCU operates in the active mode do not match, the MCU may miss the IR output signal 710.

To prevent this, according to an embodiment of the present disclosure, by adding the wakeup signal 720 to the IR output signal 710, it is possible to prevent the IR output signal 710 from being recognized.

Referring to FIG. 7B, an IR signal 730 according to an embodiment of the present disclosure may include a wakeup signal 720 and an IR output signal 710.

The IR circuit 223 of the remote control device 200 may output the IR signal 730 and transmit it to the MCU of the display device 100.

When a button is selected according to a user input, the remote control device 200 may generate the IR signal 730 and transmit the generated IR signal 730 to the display device 100.

The wakeup signal 720 may be a signal for switching the power mode of the micro control unit to the active power mode.

When the micro control unit recognizes the wakeup signal 720, the micro control unit may switch the operation mode from the low power mode to the active power mode.

The length of the wakeup signal 720 has a length covering 33.75 ms, which is a time period of one cycle including the time period (3.2 ms) of one active mode and the time period (30.55 ms) of one standby mode.

This is because the wakeup signal 720 may be recognized within the time period (3.2 ms) of the active mode included in the time period (33.75 ms) of one cycle.

The wakeup signal 720 may include at least two consecutive zero signals (off signals). The wakeup signal 720 may have 30 consecutive zeros.

Since the length of one zero signal is 1.125 ms, the wakeup signal 720 may contain 30 (1.125 ms×30=33.75 ms) zero signals to cover the time period (33.75 ms) of one cycle.

Figure 8:
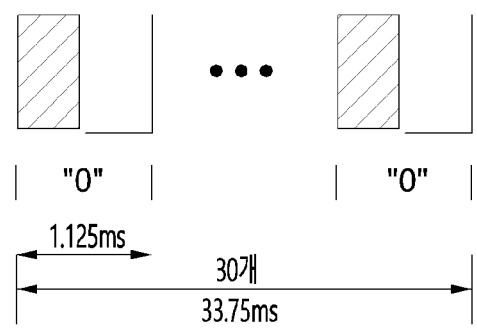
FIG. 8 is a diagram illustrating an example of a wakeup signal according to an embodiment of the present disclosure.

FIG. 8 is a diagram illustrating an example of a wakeup signal according to an embodiment of the present disclosure.

Referring to FIG. 8, a wakeup signal 800 in which 30 zero signals are combined is shown. The 30 zero signals may include the time period of one active mode and the time period of one standby mode.

The signal of FIG. 8 is only an example, and the wakeup signal may include at least two or more consecutive 0 signals and may be configured to cover a time period of one cycle.

The reason why 0 is used as the wakeup signal is that the length of the 0 signal is shorter than the length of the 1 signal and thus the probability of recognizing the 0 signal in the active mode of the micro control unit is high.

Figure 9:
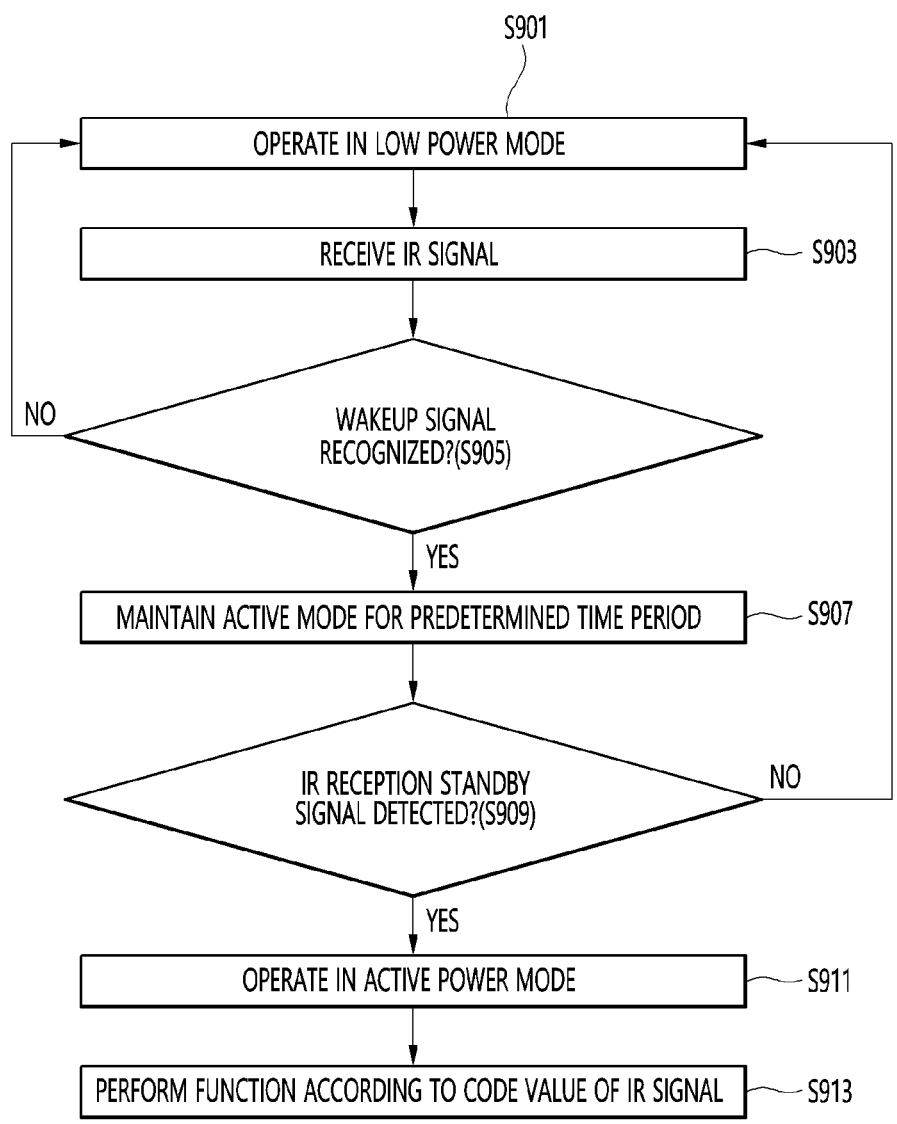
FIG. 9 is a flowchart illustrating a method of operating a display device according to another embodiment of the present disclosure.

FIG. 9 is a flowchart illustrating a method of operating a display device according to another embodiment of the present disclosure.

In the embodiment of FIG. 9, the detailed description of the same steps as those of FIG. 5 is replaced with the description of FIG. 5.

Referring to FIG. 9, the controller 170 of the display device 100 operates the power mode of the micro control unit (MCU) in the low power mode (S901).

In an embodiment, the micro control unit may include an IR reception interface capable of receiving an IR signal.

The micro control unit may be included in the user input interface 150, but is not limited thereto, and may be included in the controller 170.

In an embodiment, the power mode of the micro control unit may include a low power mode and an active power mode.

The low power mode may be a mode that a minimal amount of power is supplied to the micro control unit that receives the IR signal.

As described with reference to FIG. 6, the low power mode may be a mode in which an active mode indicating a period in which an IR signal may be recognized and a standby mode indicating a period in which an IR signal may not be recognized and it is in a standby state are periodically repeated.

The active power mode may be a mode in which an active mode in which an IR signal may be recognized is maintained.

The micro control unit of the display device 100 receives the IR signal (S903).

The micro control unit may receive the IR signal from the remote control device 200 or from the outside.

For this, the micro control unit may include an IR reception interface such as an IR sensor.

As another example, the IR reception interface may be configured separately from the micro control unit.

The controller 170 determines whether the wakeup signal is recognized from the received IR signal (S905).

The controller 170 may determine whether the wakeup signal is included in the IR signal.

In an embodiment, the wakeup signal may be a signal for operating the power mode of the micro control unit in the active mode for a predetermined time period.

The wakeup signal may be a signal for maintaining the active mode for a time period exceeding a time period allocated to the active mode. The wakeup signal may also be a type of IR signal.

The wakeup signal may be a signal including consecutive <00> data values. Data <1> and data <0> may be distinguished from each other by the length of the pulse.

A signal representing digital data 0 may be referred to as an off signal, and a signal representing digital data 1 may be referred to as an on signal.

The wakeup signal may have a time period capable of covering one active period and one standby period. For example, the wakeup signal may be a signal capable of covering a time period of approximately 33.7 ms.

This is because the wakeup signal is also a kind of IR signal and thus it must have a time period capable of covering one active period and one standby period so that it may be recognized through the active period.

For example, the wakeup signal may be a signal in which 30<0>s are combined. The wakeup signal must contain at least two consecutive zeros.

The wakeup signal is as described with reference to FIGS. 7B and 8.

When the wakeup signal is recognized from the received IR signal, the controller 170 operates the operation mode of the micro control unit in the active mode for a predetermined time period (S907).

That is, when the wakeup signal is recognized, the controller 170 may not immediately switch the operation mode of the MCU to the active power mode.

When the wakeup signal is detected, the controller 170 may increase the time period of the active mode by a predetermined time period.

This is to secure a time period in which an IR reception standby signal may be recognized, which will be described later.

Thereafter, the controller 170 determines whether the IR reception standby signal is detected (S909).

The IR reception standby signal may be a signal for switching the operation mode of the MCU from the low power mode to the active power mode. That is, the IR reception standby signal may be a signal for switching the power mode of the MCU to the active power mode so as to receive the IR signal.

In an embodiment, the IR reception standby signal may be a signal having a specific pattern.

The specific pattern may be a pattern generated through a combination of digital data 0 and 1.

The specific pattern of the IR reception standby signal will be described later.

Upon determining that the UR reception standby signal is detected, the controller 170 operates the operation mode of the micro control unit in the active power mode (911).

The controller 170 may maintain the active mode to receive IR signals at any time in active power mode.

The controller 170 performs the function of the display device 100 according to the code value of the IR signal in the active power mode (S913).

The controller 170 may read the code value indicated by the command code included in the IR signal, and perform the function of the display device 100 corresponding to the code value.

The function of the display device 100 may be any one of power on, channel change, and menu selection, but this is only an example, and functions that may be performed through an IR signal may be included.

Figure 10:
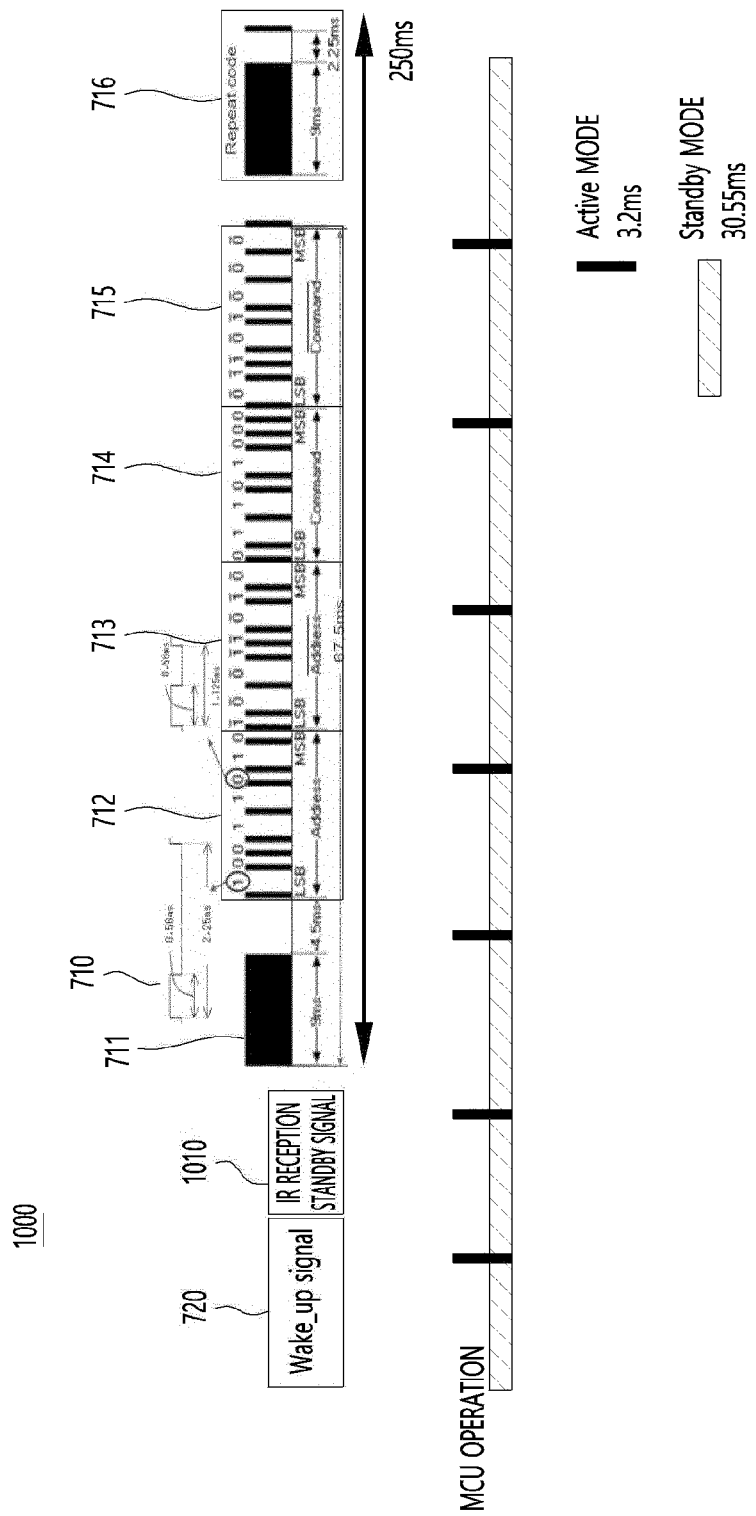
FIG. 10 is a diagram illustrating a configuration of an IR signal including a wakeup signal and an IR reception standby signal according to an embodiment of the present disclosure.

FIG. 10 is a diagram illustrating a configuration of an IR signal including a wakeup signal and an IR reception standby signal according to an embodiment of the present disclosure.

Referring to FIG. 10, the IR signal 1000 may include the wakeup signal 720, an IR reception standby signal 1010, and the IR output signal 710.

The IR signal 1000 may be received from the remote control device 200.

The description of the wakeup signal 720 and the IR output signal 710 is replaced with the description of FIGS. 7A to 8.

The controller 170 may determine whether the IR reception standby signal 1010 is detected after the wakeup signal 720 is detected.

The controller 170 may maintain the MCU in the active mode after detecting the wakeup signal 720. The controller 170 may increase the time period of the active mode by a predetermined time period.

The time period of the active mode may be a time period of 3.2 ms as described in FIG. 6, but, in an embodiment of the present disclosure, the active mode may be maintained to have a longer time period than 3.2 ms for the recognition of the IR reception standby signal 1010.

The IR reception standby signal 1010 may have a specific pattern. The IR reception standby signal 1010 may be composed of a combination of one or more zeros and one or more ones.

FIGS. 11A to 11D are diagrams illustrating a pattern of an IR standby reception signal according to various embodiments of the present disclosure.

Figure 11A:
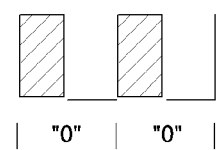
FIGS. 11A to 11D are diagrams illustrating a pattern of an IR standby reception signal according to various embodiments of the present disclosure.

Referring to FIG. 11A, a first IR standby signal 1110 is shown. The first IR reception standby signal 1110 may be a signal in which two 0 data are continuously combined.

Figure 11B:
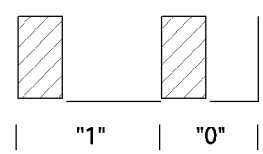

Referring to FIG. 11B, a second IR reception standby signal 1120 is shown. The second IR reception standby signal 1120 may be composed of a combination of 1 data and 0 data following 1 data.

Figure 11C:
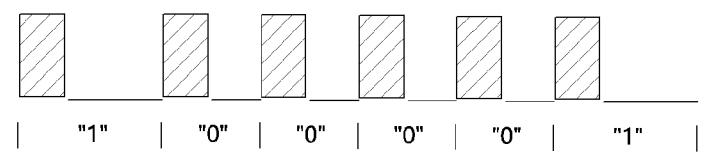

Referring to FIG. 11C, a third IR reception standby signal 1130 is shown. The third IR reception standby signal 1130 may be configured with a data pattern of <100001>.

Figure 11D:
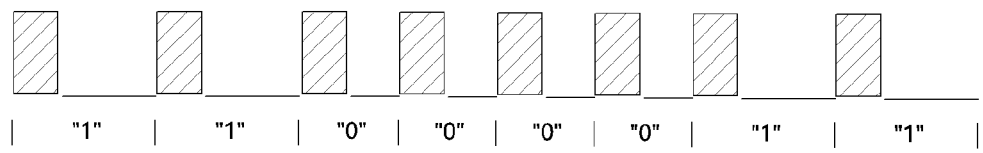

Referring to FIG. 11D, a fourth IR reception standby signal 1140 is shown. The fourth IR reception standby signal 1140 may be configured with a data pattern of <11000011>.

As the length of the IR reception standby signal is shorter, execution of the function according to the command code following the IR reception standby signal may faster, but it may be difficult to distinguish between the IR reception standby signal and external noise.

As the length of the IR reception standby signal is longer, execution of the function according to the command code following the IR reception standby signal may be slower, but it is possible to clearly distinguish between the IR reception standby signal and external noise.

Figure 12A:
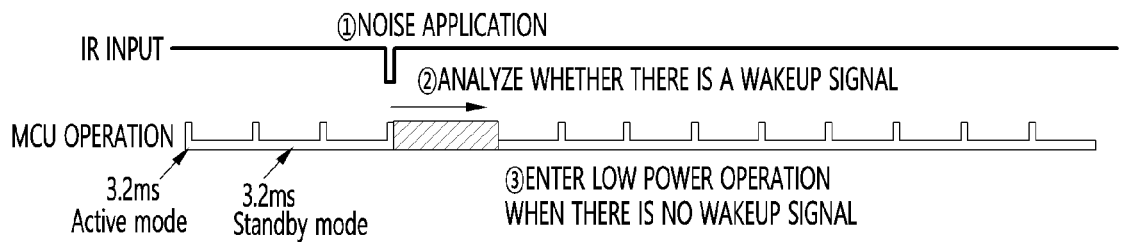
FIG. 12A is a diagram showing that the power mode of a MCU is controlled according to whether the wakeup signal is detected when an external noise signal is applied.
Figure 12B:
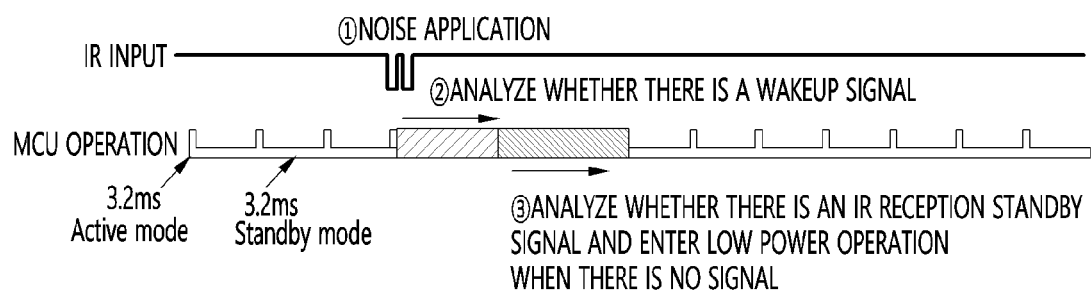
FIG. 12B is a diagram showing that the power mode of the MCU is controlled according to whether the wakeup signal and IR reception standby signal are detected when an external noise signal is applied.

FIG. 12A is a diagram showing that the power mode of the MCU is controlled according to whether the wakeup signal is detected when an external noise signal is applied, and FIG. 12B is a diagram showing that the power mode of the MCU is controlled according to whether the wakeup signal and IR reception standby signal are detected when an external noise signal is applied.

First, FIG. 12A will be described.

The controller 170 may receive an IR type external noise signal. The controller 170 may determine whether the wakeup signal is detected from the external noise signal.

The controller 170 may determine whether the wakeup signal is detected during a time period of one cycle (3.2 ms+30.55 ms=33.75 ms) including one time period in the active mode and one time period in the standby mode.

The controller 170 may switch the power mode of the MCU to the active power mode when the wakeup signal is detected.

The controller 170 may maintain the power mode of the MCU in a low power mode when the wakeup signal is not detected.

An IR method is a method of transmitting a signal using a wavelength of light, and fluorescent lamps, incandescent lamps, and LEDs used for lighting all transmit signals using wavelength.

If the signals input to an IR receiver are measured, there are signals that are input to the IR receiver once even though there is no remote control signal. Although this is a noise signal, in the conventional method, it becomes a trigger signal and there may be periods in which the MCU operates in the active power mode for receiving the IR signal. In this case, there may be a problem in realizing power consumption of 0W (strictly less than 0.0045 W) due to frequent operation in the active power mode according to the application of the noise signal.

According to an embodiment of the present disclosure, when the wakeup signal is not detected from the external noise signal, the power mode of the MCU is maintained in the low power mode to prevent an increase in power consumption of the MCU.

Next, FIG. 12B will be described.

The controller 170 may receive an IR type external noise signal. The controller 170 may determine whether the wakeup signal is detected from the external noise signal.

The controller 170 may determine whether the wakeup signal is detected during a time period of one cycle (3.2 ms+30.55 ms=33.75 ms) including one time period in the active mode and one time period in the standby mode.

The controller 170 may maintain the power mode of the MCU in the active mode when the wakeup signal is detected. In this case, the power mode of the MCU may not be a complete active power mode, but may be a low power mode that the active mode is temporarily maintained depending on whether an IR reception standby signal is detected.

When the wakeup signal is detected and the IR reception standby signal is not detected, the controller 170 may maintain the power mode of the MCU in the low power mode. That is, the controller 170 may switch the power mode of the MCU from the active mode to the standby mode.

When the wakeup signal is detected and the IR reception standby signal is detected, the controller 170 may switch the power mode of the MCU to the active power mode.

In the embodiment of FIG. 12B, since an operation is defined that an IR code is surely transmitted next when a specific pattern (IR reception standby signal) is input, the MCU operates so that the IR code is received while maintaining the active mode.

However, when the IR reception standby signal is not detected, it immediately operates in the standby mode to prevent unnecessary active operation that may occur due to erroneous reception of the wakeup signal, thereby preventing an increase in power consumption of the MCU.

Figure 13:
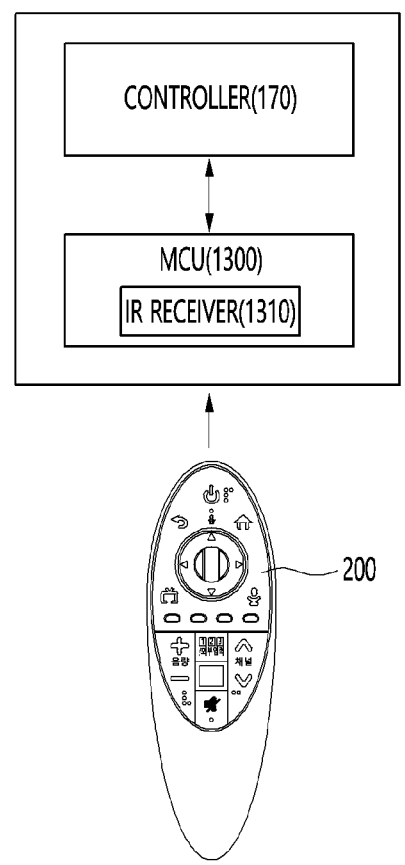
FIG. 13 is a diagram illustrating an operation relationship between components of a display device according to an embodiment of the present disclosure.

FIG. 13 is a diagram illustrating an operation relationship between components of a display device according to an embodiment of the present disclosure.

The display device 100 may include a controller 170 and a MCU 1300. The MCU 1300 may include an IR receiver 1310 that receives an IR signal from the remote control device 200. The IR receiver 1310 may be referred to as an IR circuit or an IR sensor.

The controller 170 may control the power mode of the MCU 1300 to a low power mode or an active power mode according to whether the wakeup signal is detected from the IR signal.

When the wakeup signal is detected from the IR signal, the controller 170 may control the power mode of the MCU 1300 to a low power mode or an active power mode according to whether an IR reception standby signal is detected.

According to an embodiment of the present disclosure, the above-described method may be implemented with codes readable by a processor on a medium in which a program is recorded. Examples of the medium readable by the processor include a ROM (Read Only Memory), a Random Access Memory (RAM), a CD-ROM, a magnetic tape, a floppy disk, an optical data storage device, and the like.

The above-described display device is not limited to the configuration and method of the above-described embodiments, but the embodiments may be configured by selectively combining all or part of each embodiment such that various modifications can be made.

What is claimed is:
1. A display device comprising:
a receiver configured to receive an infrared (IR) signal and to operate in a low power mode or an active power mode, the low power mode being a mode in which an active mode in which the IR signal is capable of being received and a standby mode in which the IR signal is not capable of being received are periodically repeated, and the active power mode being a mode in which the active mode is maintained; and a controller configured to determine whether a wakeup signal is detected from the IR signal while the receiver operates in the low power mode and to switch a power mode of the receiver from the low power mode to the active power mode when the wakeup signal is detected, wherein the wakeup signal has a time period covering a time period in the active mode and a time period in the standby mode.

2. The display device of claim 1, wherein the wakeup signal includes consecutive 0 data.

3. The display device of claim 1, wherein the wakeup signal includes 30 consecutive 0 data.

4. The display device of claim 1, wherein the controller maintains the active mode of the receiver and determines whether an IR reception standby signal is detected, when the wakeup signal is detected from the IR signal.

5. The display device of claim 4, wherein the controller switches the power mode of the receiver to the active power mode, when the IR reception standby signal is detected.

6. The display device of claim 4, wherein the controller maintains the power mode of the receiver in the low power mode, when the IR reception standby signal is not detected.

7. The display device of claim 4, wherein the IR reception standby signal is composed of a combination of one or more 0 data and one or more 1 data.

8. The display device of claim 1, wherein the controller performs a function of the display device corresponding to a code value included in the IR signal, in the active power mode.

9. The display device of claim 1, wherein the controller maintains the power mode of the receiver in the low power mode, when the wakeup signal is not detected.

10. A system comprising:

a remote control device configured to output an infrared (IR) signal; and a display device including receiver configured to receive the IR signal and to operate in a low power mode or an active power mode, the low power mode being a mode in which an active mode in which the IR signal is capable of being received and a standby mode in which the IR signal is not capable of being received are periodically repeated, and the active power mode being a mode in which the active mode is maintained, wherein the display device is configured to determine whether a wakeup signal is detected from the IR signal while the receiver operates in the low power mode and switch a power mode of the receiver from the low power mode to the active power mode when the wakeup signal is detected, wherein the wakeup signal has a time period covering a time period in the active mode and a time period in the standby mode.

11. The system of claim 10, wherein the wakeup signal includes consecutive 0 data.

12. The system of claim 11, wherein the wakeup signal includes 30 consecutive 0 data.

13. The system of claim 10, wherein the display device maintains the active mode of the receiver and determines whether an IR reception standby signal is detected, when the wakeup signal is detected from the IR signal.

14. The system of claim 13, wherein the display device switches the power mode of the receiver to the active power mode, when the IR reception standby signal is detected.

15. The system of claim 13, wherein the display device maintains the power mode of the receiver in the low power mode, when the IR reception standby signal is not detected.

16. The system of claim 13, wherein the IR reception standby signal is composed of a combination of one or more 0 data and one or more 1 data.

17. The system of claim 10, wherein the display device performs a function of the display device corresponding to a code value included in the IR signal, in the active power mode.

18. The system of claim 10, wherein the display device maintains the power mode of the receiver in the low power mode, when the wakeup signal is not detected.

* * * * *